United States Patent [19]

Born et al.

[11] Patent Number: 4,844,234

[45] Date of Patent: Jul. 4, 1989

[54] ARRANGEMENT FOR CONVERTING A MULTI-TRACK STREAM OF CONTAINERS INTO A PLURALITY OF PARALLEL CONTAINER ROWS THAT ARE SEPARATED FROM ONE ANOTHER BY SEPARATING ELEMENTS

[75] Inventors: Gerhard Born, Bingen; Karl Münch, Heppenheim, both of Fed. Rep. of Germany

[73] Assignee: Seitz Enzinger Noll Maschinenbau Aktiengesellschaft, Mannheim, Fed. Rep. of Germany

[21] Appl. No.: 175,091

[22] Filed: Mar. 30, 1988

[30] Foreign Application Priority Data

Mar. 30, 1987 [DE] Fed. Rep. of Germany ....... 3710528

[51] Int. Cl.$^4$ ................. B65G 47/26; B65G 47/66
[52] U.S. Cl. .................................. 198/458; 198/444; 198/600
[58] Field of Search ................ 198/444, 454, 458, 600

[56] References Cited

U.S. PATENT DOCUMENTS

| | | | |
|---|---|---|---|
| 2,769,522 | 11/1956 | Pfeiffer | 198/458 |
| 3,095,960 | 7/1963 | Luginbuhl | 198/444 |
| 3,379,299 | 4/1968 | Griner | 198/458 |
| 3,675,755 | 7/1972 | Hopwood-Jones | 198/454 |
| 3,767,027 | 10/1973 | Pund et al. | 198/458 |
| 3,860,232 | 1/1975 | Martin | 198/458 |
| 3,862,681 | 1/1975 | Barker | 198/563 |
| 4,653,629 | 3/1987 | Born | 198/600 |
| 4,708,232 | 11/1987 | Born et al. | 198/453 |

FOREIGN PATENT DOCUMENTS

| | | | |
|---|---|---|---|
| 1267592 | 1/1969 | Fed. Rep. of Germany . | |
| 2727277 | 1/1979 | Fed. Rep. of Germany | 198/444 |
| 0993998 | 2/1965 | United Kingdom | 198/458 |

Primary Examiner—Andres Kashnikow
Assistant Examiner—Timothy Newholm
Attorney, Agent, or Firm—Becker & Becker, Inc.

[57] ABSTRACT

An arrangement for converting a multi-track stream of containers into a plurality of parallel container rows that are separated from one another by separating elements. A feed mechanism conveys the containers, and a withdrawal mechanism is divided by the separating elements into a plurality of lanes, one for each of the container rows. A transition zone is disposed between the feed mechanism and the withdrawal mechanism, and is formed by the upper lengths of a plurality of conveyer bands that are disposed in the conveying direction, and transverse to this direction are disposed adjacent one another. The containers of the multi-track stream are distributed to the individual lanes in this transition zone. The conveyer bands of the transition zone spread apart in a fan-like manner in such a way that the lateral spacing between the upper lengths of adjacent conveyer bands increases in the conveying direction from the feed mechanism, with a maximum value of this spacing being less than the diameter of the containers and/or the width of the lanes of the withdrawal mechanism.

26 Claims, 6 Drawing Sheets

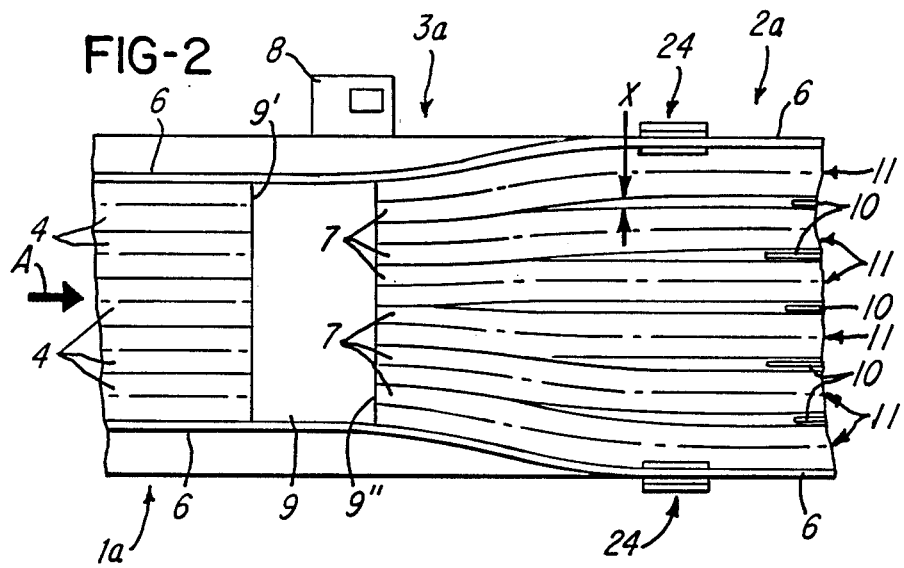
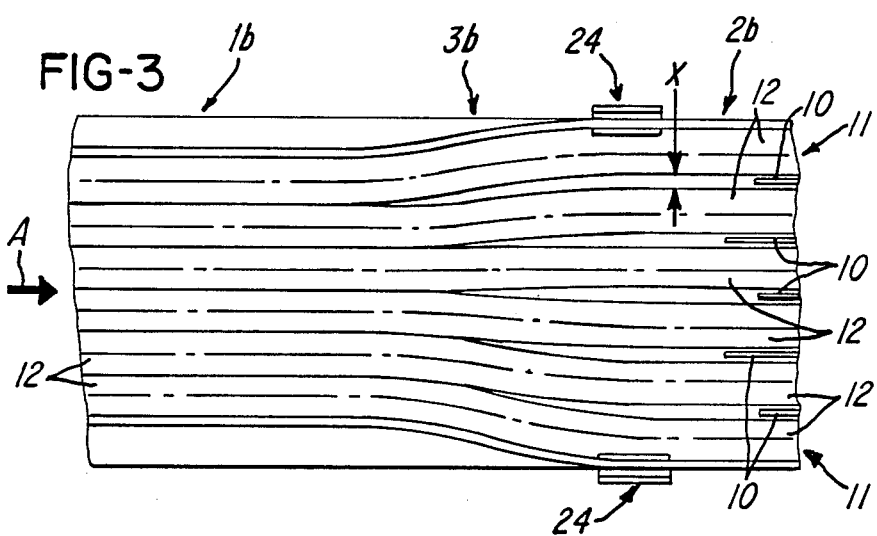

Fig. 6
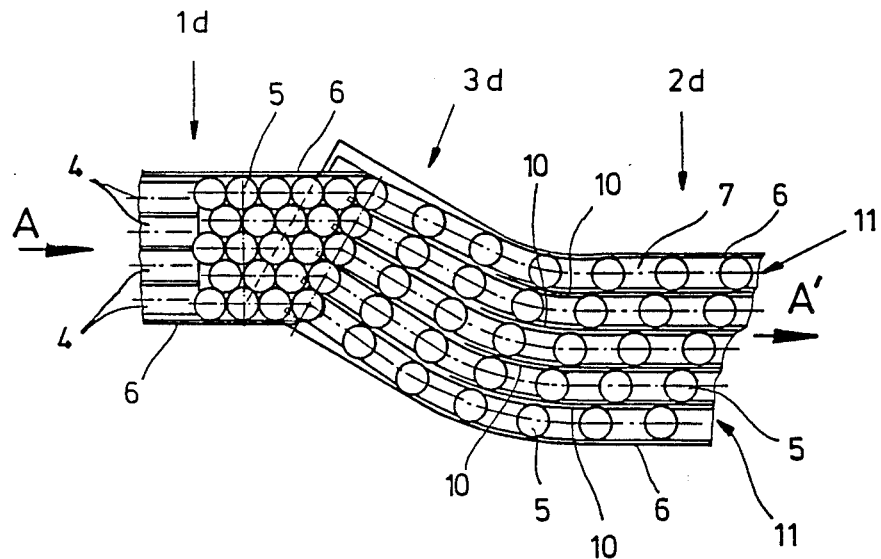
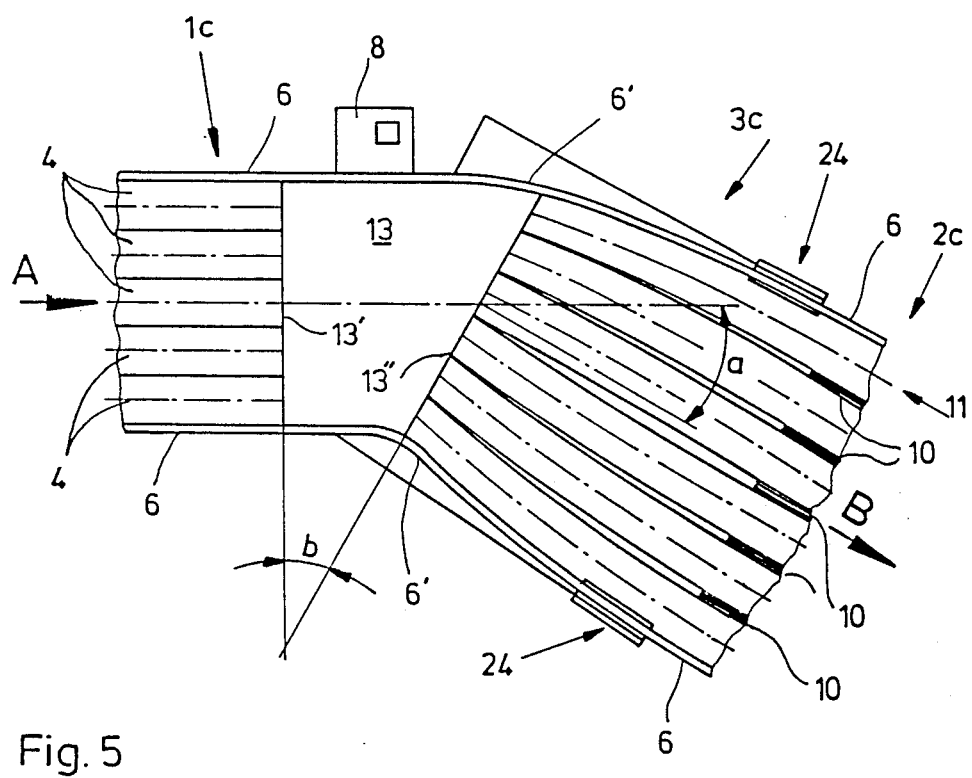
Fig. 5

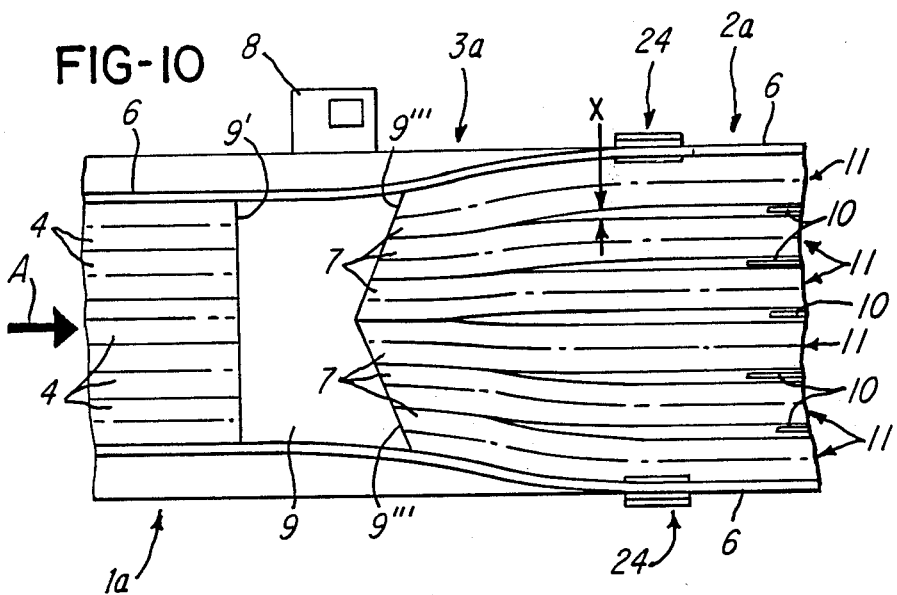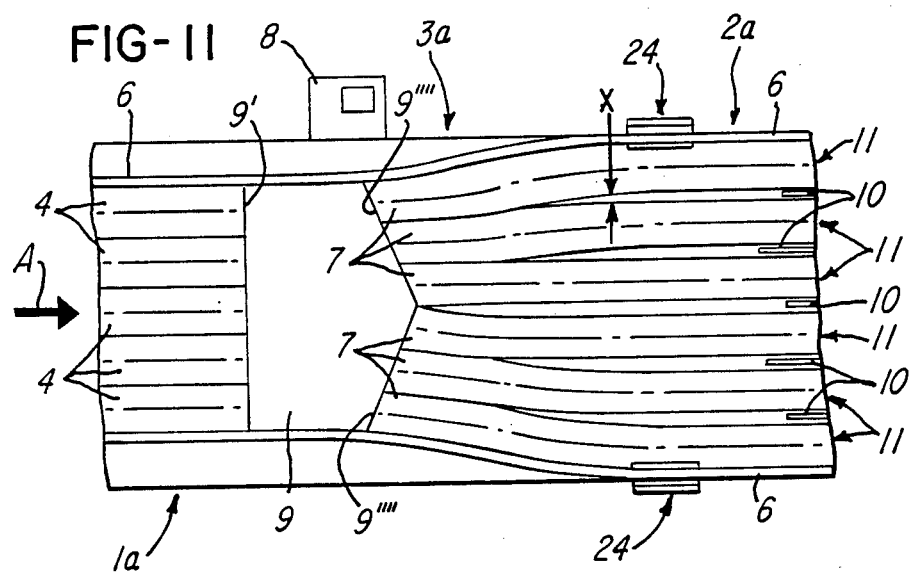

ARRANGEMENT FOR CONVERTING A MULTI-TRACK STREAM OF CONTAINERS INTO A PLURALITY OF PARALLEL CONTAINER ROWS THAT ARE SEPARATED FROM ONE ANOTHER BY SEPARATING ELEMENTS

BACKGROUND OF THE INVENTION

The present invention relates to an arrangement for converting a multi-track, closely packed stream of bottles or other containers into a plurality of parallel rows of containers, with such rows being separated from one another by parallel, spaced-apart separating elements, and with the number of such rows being equal to the number of tracks of the stream of containers. A feed mechanism is provided for conveying the containers and a withdrawal mechanism is provided downstream of the feed mechanism. The withdrawal mechanism is divided by the separating elements, which extend in the conveying direction of the withdrawal mechanism, into a plurality of lanes, one for each of the rows of containers. The withdrawal mechanism has a conveying width that is greater than the conveying width of the feed mechanism. A transition zone is disposed between the feed mechanism and the withdrawal mechanism, and serves to distribute the containers of the multi-track stream into the individual lanes of the withdrawal mechanism. The transition zone is formed by the upper lengths of a plurality of conveyer bands that are disposed in the conveying direction and, transverse to this direction, are disposed next to one another.

Within the context of the present invention, a "multi-track, closely packed stream of containers" means a stream in which the containers are either actually tightly packed together in a plurality of tracks or rows, i.e. their peripheral surfaces rest against one another, or at least the configuration of the element that conveys this stream of containers provides the possibility that the peripheral surfaces of the containers of different rows or tracks can directly contact one another. In contrast, "rows of containers that are separated from one another" means that the containers of a given row are respectively accommodated by a lane of the withdrawal mechanism, with the containers of one lane being separated by a separating element from the containers of an adjacent lane.

An arrangement of the aforementioned type serves in particular to form, from a conveyed stream of containers, the container rows that are necessary for a container-packing machine.

With one known arrangement (German Patent No. 12 67 592 Rudert dated Jan. 2, 1969 and belonging to Enzinger-Union-Werke of Mannheim, West-Germany) that is provided for this purpose, the containers are supplied as a single-track stream of containers to a container back-up table that is formed by a plurality of adjacent conveyer bands that are driven in an endlessly circulating manner, with the conveying direction of the bands being disposed at right angles to the conveying direction of the feed mechanism, so that the containers undergo a 90° change in movement when they are transferred to the container back-up table. The conveyer bands that form this table are disposed parallel to one another over the entire length of the table, so that adjacent conveyer bands are only slightly and uniformly spaced from one another over the entire length of the table.

After the containers have been transferred from the feed mechanism, they are formed on the back-up table into a more or less closely packed stream of containers in which the respectively subsequent containers rest under pressure against the preceding containers; the stream of containers is delimited by two side guide railings that determine the conveying width of the back-up table. After passing a transition zone, during the course of which the conveying width of the back-up table increases, the containers are moved into parallel lanes that are formed at the end of the back-up table and are respectively separated from one another by separating elements or partitions; a plurality of container rows that are separated from one another are thus formed. The number of lanes is the same as the number of tracks that the container stream has before it reaches the transition zone or during the time that it passes this transition zone. Since the containers in the more or less tightly packed container stream inevitably assume an approximately honeycombed formation due to their circular cross-sectional peripheral shape, with each container of a given track being staggered relative to the containers of an adjacent track, in order to transfer the containers into the individual lanes, it is an absolute necessity with the heretofore known arrangement that the containers of at least the outer tracks of the multi-track container stream be pressed to the side by subsequent containers, and that those containers that do not enter a lane purely by chance after they pass the transition zone be guided or introduced into the next lane by the pressure of the subsequent containers.

An important, functionally caused drawback of the heretofore known arrangement is therefore first of all that impacts, and therefore a high noise level, cannot be avoided between the individual containers, especially in the region of the transition zone, and also during introduction of the containers into the individual lanes. Another drawback of the heretofore known arrangement is that due to the introduction of the containers into the individual lanes under pressure, it is impossible to prevent a number of containers from wedging against one another at the inlet of, for example, a lane in such a way that it is no longer possible to introduce the containers into this lane. For the aforementioned reasons, the output efficiency that can be achieved with the heretofore known arrangement is also limited.

It is therefore an object of the present invention to improve an arrangement of the aforementioned general type in such a way that a conversion of the conveyed stream of containers into rows of containers that are separated from one another can be effected in a manner that is free of impact and pressure.

BRIEF DESCRIPTION OF THE DRAWINGS

This object, and other objects and advantages of the present invention, will appear more clearly from the following specification in conjunction with the accompanying schematic drawings, in which:

FIG. 2 is a view similar to that of FIG. 1, but without the containers;

FIG. 3 is a view providing an illustration, similar to that of FIG. 2, of a second exemplary embodiment of the inventive arrangement;

FIGS. 4 and 5 are views similar to those of FIGS. 1 and 2 of a third exemplary embodiment of the inventive arrangement;

FIG. 6 is a view similar to that of FIG. 1 of a fourth exemplary embodiment of the inventive arrangement;

FIG. 10 is a plan view similar to that of FIG. 2 in a further modification; and

FIG. 11 is also a plan view similar to that of FIG. 2 in still another modification.

SUMMARY OF THE INVENTION

Figure 4:
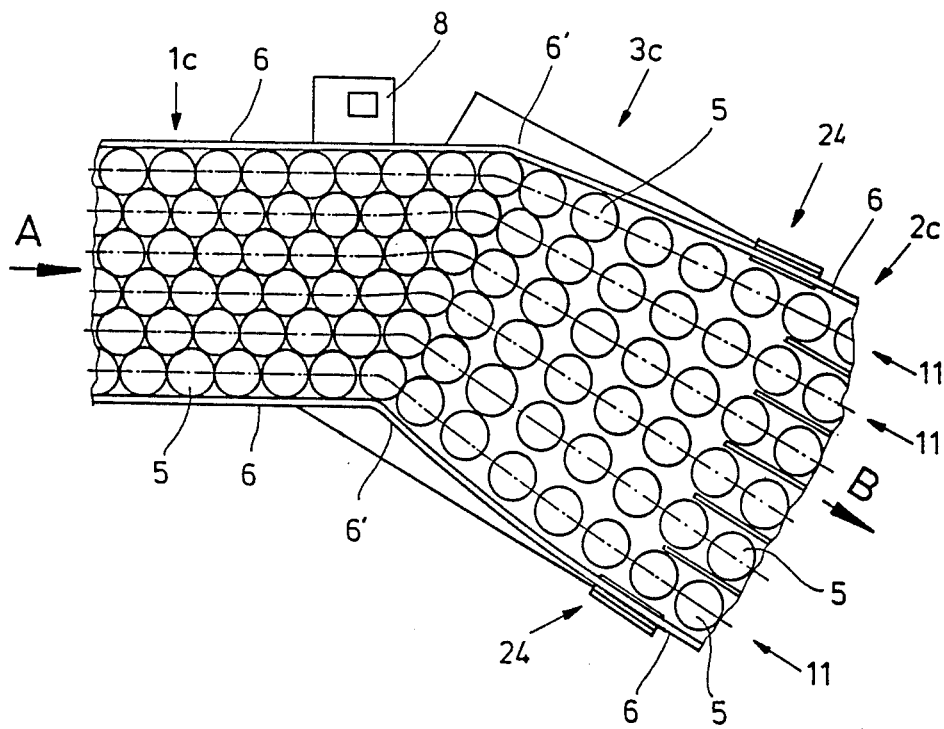

The arrangement of the present invention is characterized primarily in that during the course of the transition zone, the conveyer bands that form the latter spread apart in a fan-like manner in such a way that the lateral spacing between the upper lengths of adjacent conveyer bands increases in the conveying direction from the feed mechanism, and in that the maximum value of this spacing is always less than the diameter of the containers and/or of the width of the lanes formed in the withdrawal mechanism.

As a result of the fan-like path of the conveyer bands, the containers, especially bottles, that are supplied to the transition zone are moved not only in the conveying direction during the time that they are in the transition zone, but rather these containers also have imparted to them, via the conveyer bands, a movement component that extends transverse to the conveying direction, so that the stream of containers is spread to the width required for introduction into the lanes of the withdrawal mechanism entirely by the conveyer bands that form the transition zone, and not by the pressure of subsequent containers. Thus, with the inventive arrangement, the distribution of the supplied stream of containers to the individual lanes that form the withdrawal mechanism is effected not only in a manner free of pressure and impact, but above all also in a quiet manner. It is in particular also possible with the inventive arrangement, by appropriate selection of the conveying speed of the transition zone relative to the conveying speed of the feed mechanism, to achieve a completely opened-up or separated stream of containers during the course of the transition zone of such a form that the individual containers of this stream are spaced far enough apart that the bottles do not bump against one another.

Since in order to spread the container stream with the inventive arrangement it is not necessary that the containers contact one another, in other words, in particular, trailing containers do not have to bump against preceding containers, but rather the conveyed container stream is continuously spread apart during the course of the transition zone, and the individual containers continuously enter the lanes of the withdrawal mechanism, a considerably greater output capacity (containers processed per unit of time) is possible with the inventive arrangement. A factor that contributes to this is that with the inventive arrangement the containers are already supplied as a multi-track stream via the feed mechanism.

In principle, it is possible pursuant to the present invention that the conveyer bands that form the transition zone also be part of the feed mechanism. However, pursuant to a preferred embodiment of the present invention, the conveyer bands that form the transition zone are independent from the feed mechanism; if the latter is also formed from a plurality of adjacent conveyer bands, the number of conveyer bands that form the transition zone is greater than the number of conveyer bands of the feed mechanism.

Pursuant to a particularly preferred embodiment of the present invention, at least the transition zone is formed from a plurality of very narrow conveyer belts. This embodiment has the advantage that even with an arrangement where the width of the lanes formed in the withdrawal mechanism can be adjusted to adapt to various sizes of containers, an optimum manner of operation is assured, independent of the width to which these lanes are adjusted at any given time, since due to the very narrow configuration of the conveyer belts of the transition zone, at any given time at least one such conveyer belt is disposed at the start of each lane between the separating elements that delimit these lanes at that location.

Furthermore pursuant to the present invention, the conveyer belts that form the transition zone preferably continue into the region of the withdrawal mechanism, i.e. these conveyer belts also form the conveyer belts of at least that portion of the withdrawal mechanism that follows the transition zone.

Further specific features of the present invention will be described in detail subsequently.

DESCRIPTION OF PREFERRED EMBODIMENTS

Figure 1:
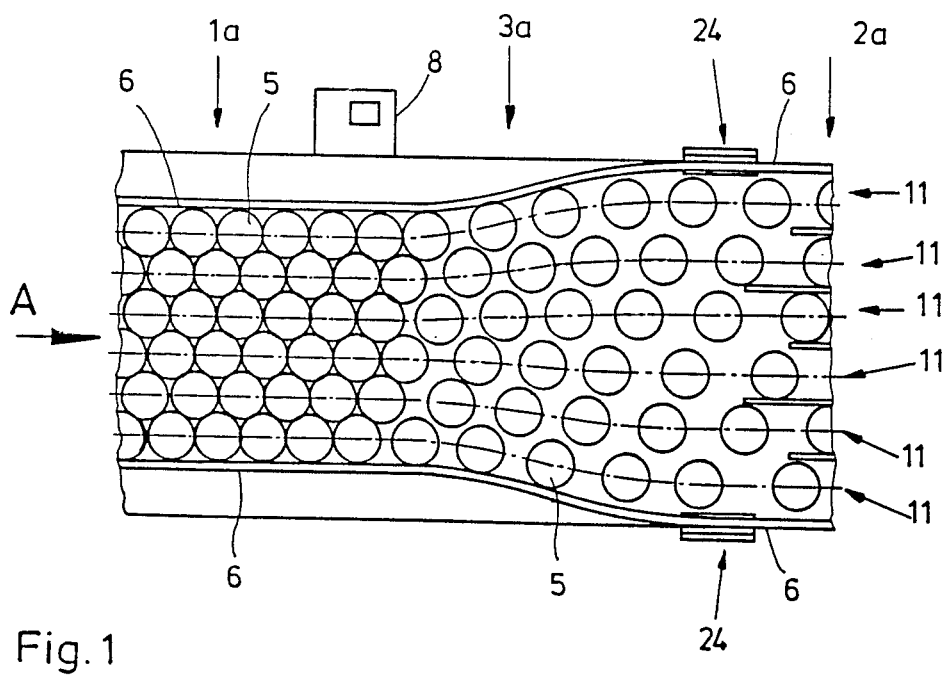
FIG. 1 is a simplified plan view of one exemplary embodiment of the invention arrangement together with the containers that form the conveyed container stream and container rows.

Referring now to the drawings in detail, the embodiment illustrated in FIGS. 1 and 2 comprises a feed mechanism 1a, a withdrawal mechanism 2a, and a transition zone 3a that is formed between the end of the feed mechanism 1a and the start of the withdrawal mechanism 2a.

As shown in particular in FIG. 2, the feed mechanism 1a essentially comprises four conveyer belts or jointed band chains 4 that are each continuous and are driven in an endless circulating manner. The upper lengths of the belts or band chains 4 extend in the conveying direction A of the feed mechanism 1a and are disposed next to one another in a directly abutting manner transverse to the conveying direction A. These upper lengths form an essentially horizontal support surface for upright bottles or other containers 5. With the aid of a drive mechanism 8, the belts or band chains 4 are rotated and are guided via non-illustrated guide rollers or wheels at the start of as well as at the end of the feed mechanism 1a, i.e. where the latter merges with the transition zone 3a.

On both sides, transverse to the conveying direction A, the feed mechanism 1a is delimited by a guide railing 6. The conveying width of the feed mechanism 1a is determined by the distance between the two guide railings 6.

In the region of the transition zone 3a, the support surface for the containers 5, which is again essentially horizontal, is formed by the upper lengths of a total of six conveyer belts or joined band chains 7. In this embodiment, the band chains 7 continue in the region of the withdrawal mechanism 2a, where their upper lengths also form the support surfaces for the containers 5. The band chains 7 are also continuous and are driven in an endless circulating manner, for which purpose, at both the transfer region between the feed mechanism 1a and the transition zone 3a as well as at the transfer region of the right end of the withdrawal mechanism 2a, which is not shown in FIGS. 1 and 2, the band chains 7 are respectively guided via guide rollers or wheels, with those guide wheels that are provided at the end of the withdrawal mechanism 2a being driven by a drive mechanism that corresponds to the rive mechanism 8 in such a way that the upper lengths of the band chains 7 are moved in the conveying direction A.

Disposed at the transfer region between the feed mechanism 1a and the transition zone 3a is a fixed back-up plate 9, the upper, horizontal surface of which is disposed at approximately the same level as the support surfaces formed by the band chains 4 and 7. At the transfer region between the feed mechanism 1a and the transition zone 3a, the back-up plate 9 forms a stationary support for the containers 5. In the illustrated embodiment, when viewed in the conveying direction A, the front or trailing edge 9' as well as the rear or leading edge 94" of the back-up plate 9 are both disposed perpendicular to the conveying direction A. As shown by the lines 9'" and 9"" in FIG. 10 and FIG. 11 respectively, the rear edge of a back-up plate 9 can also be formed by two portions that extend at an angle to the conveying direction A, with these sections merging with one another in the center of the conveying width of the transition zone 3a and forming an angle with one another that opens either counter to the conveying direction A or in this direction.

As also shown in FIG. 2, in the region of the transition zone 3a, the two guide railing 6 are each guided outwardly symmetrical to the central axis of the transition zone 3a, which central axis extends in the conveying direction A, so that as one progresses further into the transition zone 3a, in the conveying direction A, the distance between the two guide railings 6 increases and these guide railings 6, which also form the lateral delimitation for the withdrawal mechanism 2a, are spaced further from one another in the region of the withdrawal mechanism 2a than in the region of the feed mechanism 1a. In other words, the width of the withdrawal mechanism 2a is greater than the width of the feed mechanism 1a.

FIG. 2 furthermore shows that the upper lengths of the band chains 7, in the region of the transition zone 3a, are guided by non-illustrated guide means in such a way that these upper lengths of the band chains 7, starting from the transfer region between the feed mechanism 1a and the transition zone 3a, in other word starting from the back-up plate 9, again diverge or extend from one another, symmetrical to the central axis that is disposed in the conveying direction A in a fanlike manner and in such a way that the upper lengths of adjacent band chains 7, in the conveying direction A, are respectively spaced from one another by an increasing distance "x", with these distances "x", at the transfer region between the transition zone 3a and the withdrawal mechanism 2a, in other words at that location where the distances "x" have their maximum value, in each case being considerably less than the diameter, i.e. the support surface, of the containers 5.

In the illustrated embodiment, at the withdrawal mechanism 2a, where the upper lengths of the band chain 7 continue to have the spacing "x" from one another, between the two guide railings 6 five intermediate railings or partitions 10 are provided that respectively extend parallel to, and at a distance from, one another in the conveying direction A. The partitions 10 divide the withdrawal mechanism 2a into six lanes 11, each of which has the same width. The two outer lanes 11 are laterally delimited by one of the guide railings 6 and one of the partitions 10, while the inner lanes 11 are laterally delimited by the partitions 10. The support surfaces for the containers 5 in the lanes 11 are respectively formed by the upper length of a given band chain 7. Furthermore, in the embodiment illustrated in FIGS. 1 and 2, the partitions 10 are embodied in such a way that starting from one side of the withdrawal mechanism 2a, i.e. starting from one of the guide railings 6, the front or trailing end, in the conveying direction A, of each second partition 10 projects beyond the other partitions 10 in a direction counter to the conveying direction A. Since both at the transfer region between the feed mechanism 1a and the transition zone 3a, as well as in the region of the withdrawal mechanism 2a, the upper lengths of the band chains 7 are disposed in the conveying direction, while in the region of the transition zone 3a these lengths extend in a fanlike manner from one another as previously described, the upper lengths of the band chains 7 have a flat, S-shaped path in the region of the transition zone.

As illustrated in FIG. 1, the containers 5 are supplied by the feed mechanism 1a as a closely packed, multi-track stream of containers. At least at the end of the feed mechanism 1a, not only do the peripheral surfaces of the containers 5 rest directly against one another, but the containers 5 are also staggered in a honeycombed manner in such a way that each container 5 of a given row or track of the multi-track stream of containers is staggered relative to the containers of an adjacent row of the stream of containers by one half of the diameter of the containers. By using the back-up plate 9, this formation of the containers 5 is always assured at the end of the feed mechanism 1a, because the containers that are resting upon the back-up plate 9 are conveyed or pushed further along only by subsequent containers.

Since the band chains 7 preferably rotate at a somewhat greater speed than do the band chains 4, the containers 5, after they pass the back-up plate 9, form an opened-up or separated stream of containers at the transition zone 3a. The formation of this separated stream of containers can also be influenced by the shape or orientation of the aforementioned rear edges 9", 9'" or 9"" of the back-up plate 9. As a result of the path of the upper lengths of the band chains 7 in the region of the transition zone 3a, the containers 5 in this zone are also moved outwardly transverse to the conveying direction A, with the outer containers 5 being moved more transversely than are the inner containers 5. The separated stream of containers thus also has a more spread-apart width, so that the containers 5 then eventually move smoothly into the lanes 11 of the withdrawal mechanism 2a without bumping one another. Here they form themselves into a plurality of parallel rows of containers, with six such rows being shown in the illustrated embodiment. As a result of the separating and spreading of the stream of containers at the transition zone 3a, the tightly packed stream of containers is converted into the rows of containers of the lanes 11 in a smooth manner without pressure, and especially with little noise. The use of the back-up plate 9 assures that even if gaps are present in the stream of containers that is being conveyed, at least at the end of the feed mechanism 1a a tightly packed stream of containers will exist. In other words, even if small gaps are present in the stream of containers that is being conveyed, at the end of the feed mechanism 1a the same conditions will always exist that lead to an optimum distribution of the containers 5 to the individual lanes 11.

The embodiment illustrated in FIG. 3 differs from that of FIGS. 1 and 2 essentially only in that instead of separate band chains 4 and 7 for the feed mechanism 1b, the withdrawal mechanism 2b, and the intermediately disposed transition zone 3b, common band chains 12 are used, the upper lengths of which, that again form the support surfaces for the containers 5, extend from the feed mechanism 1b to the withdrawal mechanism 2b. Also with this embodiment, in the transition zone 3b the upper lengths of the band chains 12 are again guided apart in a fan-like manner in such a way that the distance "x" between the upper lengths of two adjacent band chains 12 increases in the conveying direction A, and the upper lengths of the band chains 12, in the region where they form the transition zone 3b, have the flat, S-shaped path that was already described in connection with the band chains 7 in the region of the transition zone 3a of the embodiment of FIGS. 1 and 2.

FIGS. 4 and 5 show an embodiment that essentially differs from the embodiment of FIGS. 1 and 2 only in that the transition zone 3c and the withdrawal mechanism 2c are not in line with the feed mechanism 1c. Rather, the conveying direction B of the transition zone 3c and of the withdrawal mechanism 2c forms an angle "a" with the conveying direction A of the feed mechanism 1c. In the illustrated embodiment, this angle is greater than 40°, yet less than 90°, and is open in both conveying directions A and B.

In this embodiment, at the transfer region between the feed mechanism 1c and the withdrawal mechanism 3c there is provided a back-up plate 13, the function and construction of which basically corresponds to that of the back-up plate 9 of the embodiment of FIGS. 1 and 2. However, the back-up plate 13 has an essentially trapezoidal configuration, with the extensions of the front edge 13' and the rear edge 13" forming an angle "b" with one another; this angle is the same as the angle "a", so that the rear edge 13" is disposed perpendicular to the conveying direction B. In conformity to the disposition that the feed mechanism 1c and the withdrawal mechanism 2c as well as the transition zone 3c have relative to one another, the two guide railings 6 are curved at 6'. In other respects, the construction and function of the embodiment of FIGS. 4 and 5 correspond to those of the embodiment of FIGS. 1 and 2, so that also in the embodiment of FIGS. 4 and 5, corresponding elements have the same reference numerals as they do in FIGS. 1 and 2. A difference that exists with the embodiments of FIGS. 4 and 5 in contrast to the embodiment of FIGS. 1 to 3 is that as a result of the transition zone 3c being disposed at an angle to the feed mechanism 1c, the width of this transition zone 3c is inherently greater than the conveying width of the feed mechanism 1c. This is also evidenced by the length of the edge 13", which is greater than the length of the edge 13', so that the stream of containers can already fan out to the side after it passes the back-up plate 13.

FIG. 6 illustrates an embodiment that is similar to that of FIGS. 4 and 5. With this embodiment, the feed mechanism 1d is provide with only four band chains 4, and the withdrawal mechanism 2d as well as the transition zone 3d are formed by five band chains 7. Just as in the embodiments of FIGS. 1, 2 and 4, 5, however, also with the embodiment of FIG. 6 the number of band chains 7 that form the transition zone and the withdrawal mechanism is greater, and in particular with these examples the number of band chains 7 is greater by one, than the number of band chains 4 that form the feed mechanism. A special feature of the embodiment of FIG. 6 in contrast to the embodiment of FIGS. 4 and 5 is that the band chains 7, and hence also their upper lengths that form the horizontal support surfaces for the containers 5, are curved in an arcuate manner in a horizontal plane, using non-illustrated guide means, in the beginning region of the withdrawal mechanism 2d, so that although the transition zone 3d is angled off relative to the feed mechanism 1d, i.e. the conveying direction A of the feed mechanism 1d and the conveying direction B of the transition zone 3d form the previously mentioned angle "a", the longitudinal extension, i.e. the conveying direction A', of the withdrawal mechanism 2d is disposed parallel to the longitudinal extension, i.e. the conveying direction A, of the feed mechanism 1d.

It should be noted that a common feature of all of the previously described embodiments is that the maximum distance "x" that the upper lengths of adjacent feed chains 7 or 12 have from one another at the beginning of the withdrawal mechanism 2a, 2b, 2c, or 2d is not only considerably less than the diameter of the containers 5 or of their support surfaces, but is also considerably less than the width of the lanes 11.

Figure 7:
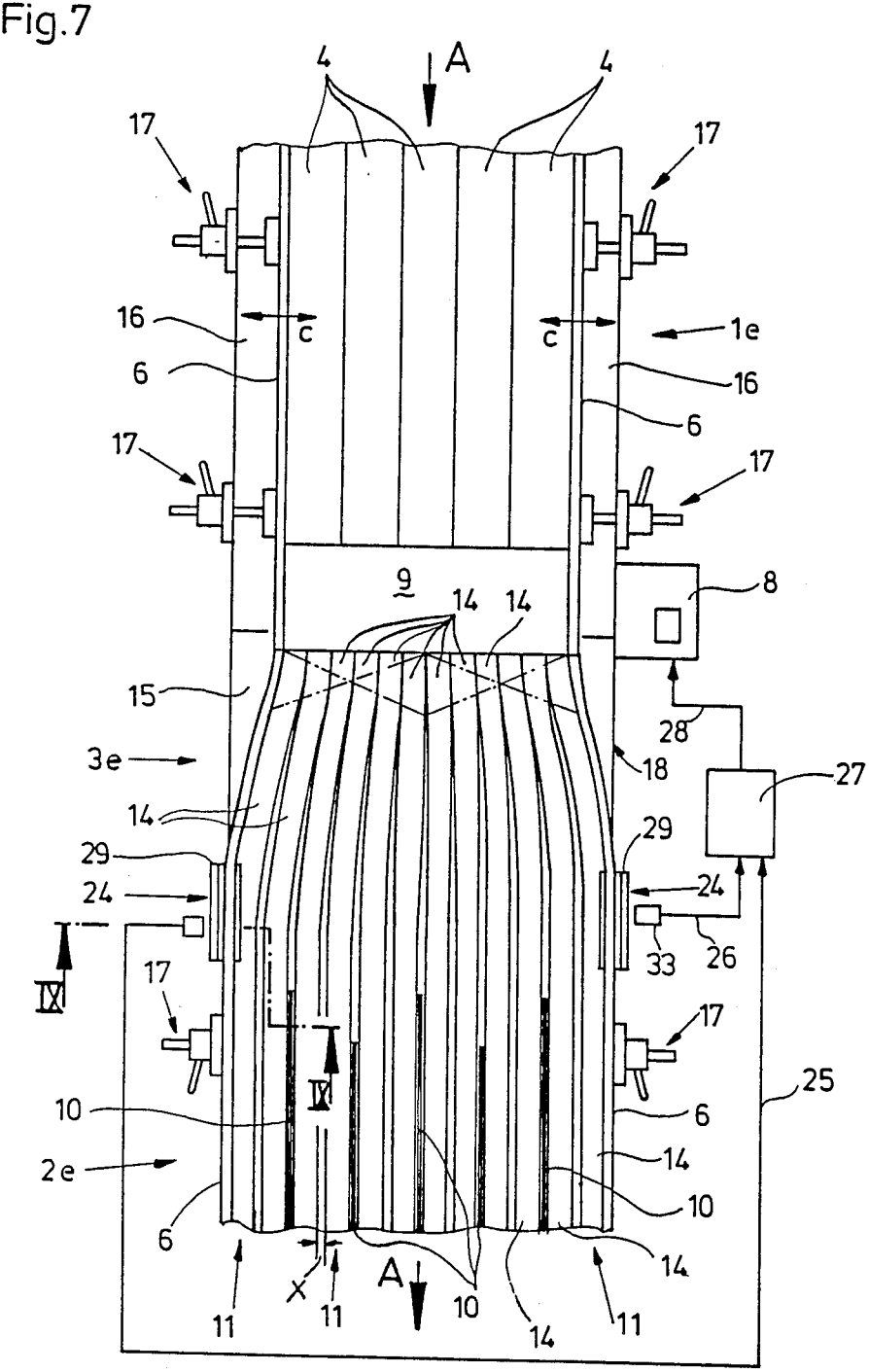
FIG. 7 is a view similar to that of FIG. 2 of a fifth exemplary embodiment of the inventive arrangement.
Figure 8:
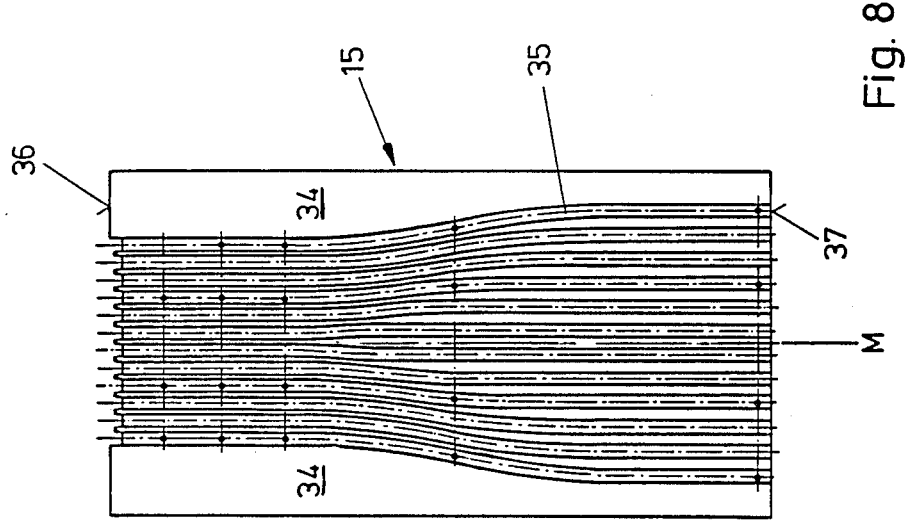
FIG. 8 is a plan view of a guide plate for use with the embodiment of FIG. 7.
Figure 9:
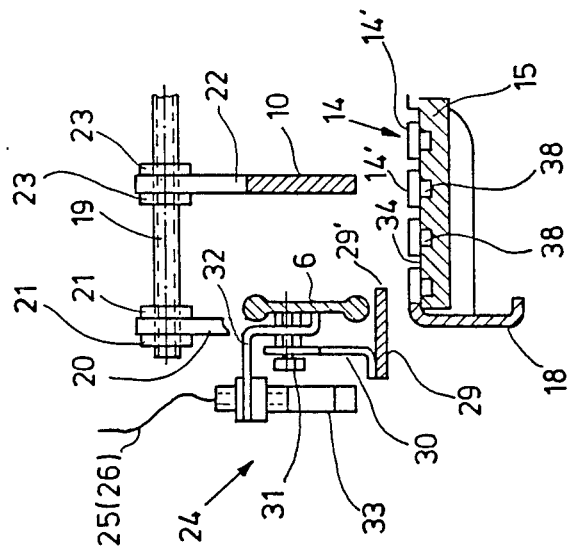
FIG. 9 is a cross-sectional view taken along the line IX—IX in FIG. 7.

FIGS. 7 to 9 illustrate a preferred embodiment, where the feed mechanism 1e is again formed by five band chains 4. Whereas with the previously described embodiments the band chains that are used to form the feed mechanism, the withdrawal mechanism and the transition zone all have the same width as measured in a direction perpendicular to the conveying direction, with the embodiment of FIGS. 7 to 9, the band chains 14 that are used for the withdrawal mechanism 2e and for the transition zone 3e are considerably narrower than are the band chains 4. In this embodiment, in conformity with the configuration of the guide plate 15 for the band chains 14, i.e. for their upper lengths, which guide plate 15 will be described in further detail subsequently, twelve band chains 14 are provided, with these band chains again being continuous and being driven in an endlessly circulating or rotating manner in such a way that the upper lengths or runs of the band chains 14, which lengths form the horizontal support surfaces for the containers 5, rotate in the conveying direction A of the feed mechanism 1e, with this conveying direction also being the conveying direction of the transition zone 3e and the withdrawal mechanism 2e. At the transfer region between the feed mechanism 1e and the transition zone 3e, i.e. below the back-up plate 9 that is again provided at this location, the band chains 14 are guided via non-illustrated guide wheels or rollers. In a similar manner, the band chains 14 are also guided over guide rollers at that end of the withdrawal mechanism 2e that is not illustrated in FIG. 7; these further guide rollers are driven by a drive mechanism, which is also not illustrated.

In a manner similar to the band chains 7 of the embodiment of FIGS. 1 and 2, here also the upper lengths of adjacent band chains 14 in the transfer region between the feed mechanism 1e and the transition zone 3e are disposed directly adjacent one another when viewed in the direction transverse to the conveying direction A, whereby at the conclusion of this transfer region, the upper lengths of the band chains 14 then spread apart in a fan-like manner, symmetrical relative to the central axis of the transition zone 3e, which central axis extends in the conveying direction A, in such a way that the distance "x" that the upper lengths of two adjacent band chains 14 are spaced from one another, increases as the path of the transition zone 3e progresses in the conveying direction. The upper lengths of the band chains 14 not only form the horizontal support surfaces for the containers 5 in the region of the transition zone 3e, but also form the support surfaces for the containers in the region of the withdrawal mechanism 2e, i.e. in the region of the lanes 11 thereof.

The embodiment of FIGS. 7 to 9 basically operates the same as the embodiment of FIGS. 1 and 2. In other words, the stream of containers that is conveyed by the feed mechanism 1e and in which the containers 5 have the formation illustrated in FIG. 1, namely six preformed rows in the conveying direction, is opened up or separated at the transition zone 3e after passing the back-up plate 9, and the bottles are also spread apart transverse to the conveying direction A by the special path that the upper lengths of the conveyer belts or band chains 14 have at the transition zone 3e, so that the containers 5 enter the individual lanes 11 of the withdrawal mechanism 2e, where they form parallel rows of containers. The maximum distance "x" that the upper lengths of adjacent band chains 14 have to one another is again considerably less than the diameter of the containers 5 and is also considerably less than the width of the lanes 11.

Since with the embodiment of FIGS. 7 to 9 the support surfaces for the containers in the region of the transition zone 3e, and also in the region of the withdrawal mechanism 2e, are formed by the upper lengths of a large number of very narrow band chains 14, the embodiment of FIGS. 7 to 9 has the particular advantage that without adversely affecting the function, not only the conveying width of the feed mechanism 1e, but also the width of the transition zone 3e and the width of the lanes 11 can be adapted to the diameter of the containers 5 by adjusting the guide railings 6 and the partitions 10. With the arrangement of FIGS. 7 to 9, it is therefore possible to process a large variety of container sizes.

In order to be able to achieve this adjustment of the guide railings 6, the latter are first of all held on a machine frame 16 of the feed mechanism 1e with the aid of adjustment elements 17. The latter permit an adjustment of the pertaining guide railing 6 in both a horizontal direction as well as perpendicular to the conveying direction A, as indicated by the double arrows C in FIG. 7. Also in the region of the withdrawal mechanism 2e, the outer guide railings 6 are held on a machine frame 18, which is provided in common for the withdrawal mechanism 2e and the transition zone 3e, in such a way that they are adjustable in the horizontal direction and perpendicular to the conveying direction A.

As shown in FIG. 9, threaded rods 19 serve to adjustably support the partitions 10, with at least two threaded rods 19 being provided on the withdrawal mechanism. The axis of each threaded rod 19 is disposed in the horizontal direction and perpendicular to the conveying direction A. Seen in the conveying direction A, the threaded rods 19 are offset relative to one another and are disposed vertically above the upper lengths of the band chains 14 by a distance that is greater than the height of the largest container 5 that is to be processed, so that the containers 5 can move by below the threaded rods 19 in an unobstructed manner. As shown in FIG. 9, both ends of a given threaded rod 19 are held on the free end of a support arm 20 that in the vertical direction projects beyond a guide railing 6, to which it is secured. To hold the threaded rod 19, the upper, free end of a respective support arm 20 is provided with a hole through which the threaded rod 19 extends. Each end of each threaded rod 19 is secured by two nuts 21 to the associated support arm 20. As shown in FIG. 9, the individual partitions 10 are suspended on the threaded rods 19 in that each partition 10, for each threaded rod 19, has a respective support arm 22 that extends beyond and above the upper edge of the threaded rod in the vertical direction. The free, upper end of each support arm 22 has a hole through which the pertaining threaded rod 19 extends. The support arms 22, and hence the partitions 10, are secured to the respective threaded rods via two nuts 23. After the nuts 21 and 23 are loosened, the outer guide railings 6, with the aid of the adjustment elements 17, and the partitions 10, can be adjusted in conformity to the diameter of the containers 5 that are to be processed. After each adjustment, the nuts 21 and 23 must be retightened.

As shown in FIG. 7, two back-up or jam indicators 24 are provided in the transition zone 3e, with one such indicator 24 being provided on each outer guide railing 6 at a certain distance, when viewed in the conveying direction A, ahead of the transfer region between the transition zone 3e and the subsequent withdrawal mechanism 2e. These back-up or jam indicators 24 serve to shut off the drive motor 8 for the band chains 4 of the feed mechanism 1e when, due to an overflowing of the lanes 11 or for some other reason, a backup or jamming of the containers 5 occurs in the region of the transition zone 3e. Each back-up or jam indicator 24 is connected via a respective line 25 or 26 to an electrical control mechanism 27, which in turn is connected via a control line 28 to the drive motor 8 and shuts off the latter if either or both of the two indicators 24 are activated.

One of the back-up or jam indicators 24 is illustrated in detail in FIG. 9. This indicator essentially comprises a plate 29 that has horizontally disposed surfaces and also has at least one support arm 30 that is secured to the plate and projects vertically beyond the upper surface thereof. Via this support arm 30, the plate 29 is supported on the pertaining guide railing 6 in a freely swinging manner. For this purpose, the upper, free end of the support arm 30 is provided with a hole through which the shaft of the retaining bolt 31 that is anchored on the guide railing 6 extends with great play. The support arm 30 is disposed beyond the movement space for the containers 5 as defined by the guide railings 6. The plate 29, which is disposed lower than the bottom edge of the guide railing 6 that extends in the conveying direction A, extends with an edge region 29' into this movement space of the containers 5, yet only to such an extent that this edge region 29' does not come into contact with the containers 5 during normal operation of the inventive arrangement. Beyond the movement space of the containers 5 as defined by the guide railings 6, a signal emitter 33 that operates without making contact is provided on the guide railing 6 via a support 32. The signal emitter 33 cooperates with the plate 29, or with the metal support arm 30 of the plate 29. If for some reason a container back-up or jam occurs in the region of the transition zone 3e, one or more containers 5 will inevitably move outwardly in such a way that at least one container will bump against the edge region 29' of the plate 29 and will pivot the latter outwardly, so that the plate 29, or the metal support arm 30 provided thereon, will pass into the effective range of the inductive signal emitter 33, which will then deliver a signal via the line 25 or 26 to the control mechanism 27 for shutting off the electric motor 8. If the container back-up in the region of the transition zone 3e clears up, the two indictors 24 are again disposed in their starting position, in other words, the drive motor 8 is again turned on to further convey the containers 5.

The guide plate 15 serves to guide the upper lengths or runs of the band chains 14 along the transition zone 3e as well as in the beginning region of the withdrawal mechanism 2e. The upper surfaces 34 of the guide plate 15 are disposed in a horizontal plane on the machine frame 18 directly below the upper lengths of the band chains 14, so that the undersides of the portions 14′ that form the individual lengths of the band chains 14 rest upon this surface in a sliding manner. Provided in the surface 34 of the guide plate 15 are a plurality of, in the illustrated embodiment a total of twelve, guide grooves 35 that each extend over the entire length of the guide plate 15 in the conveying direction A, and are disposed next to one another when viewed at right angles to this length, i.e. to the conveying direction A. The guide grooves 35 are furthermore open to the transverse ends 36 and 37 of the guide plate 15. These transverse ends extend at right angles to the conveying direction A, with the transverse end 36 being disposed at the transfer region between the feed mechanism 1e and the transition zone 3e, while the transverse end 37 is disposed in the transfer region between the transition zone 3e and the withdrawal mechanism 2e. The path of the guide grooves 35 corresponds to the path that the upper lengths of the band chains 14 have in the region of the transition zone 3e and where they merge into the withdrawal mechanism 2e, in other words, the center-to-center distance between two adjacent guide grooves 35 in the region of the transverse end 36 is approximately equal to the width of the band chains 14, or to the width that the portions 14′ have at right angles to the direction of movement of the band chains 14, whereas in the region of the transverse end 37, this center-to-center distance between two adjacent guide grooves 35 is greater than the distance at the transverse end 36 by the amount "x". As shown in FIG. 8, the guide grooves 35 also have the flat, S-shaped path that is typical for the path of the band chains 14, with this path being considerably more pronounced for those guide grooves 35 that are spaced further from the central plane M of the guide plate 15, which central plane is disposed in the conveying direction A, than for those guide grooves 35 that are disposed near this central plane M. For each band chain 14 a respective guide groove 35 is provided into which extend guide elements that are provided on the underside of the portions 14′ of these band chains 14, and that project beyond the underside of the portions 14′. These guide elements of the band chains 14 are formed by the projections 38 that are already provided on the individual portions 14′ of band chains, and via which the individual portions 14′ are hingedly interconnected to form a respective band chain 14. In order to achieve as quiet a running of the band chains 14 as possible with little friction, the guide plate 15 is made of a hard plastic. In principle, it is of course also possible to make the guide plate 15 of plastic only in the region of the guide grooved 35, or along those edges that define guide grooves and on which the portions 14′ slide.

The present invention is, of course, in no way restricted to the specific disclosure of the specification and drawings, but also encompasses any modifications within the scope of the appended claims.

What we claim is:

1. An arrangement for converting a multi-track, closely packed stream of containers into a plurality of parallel rows of containers, with such rows being separated from one another by parallel, spaced-apart separating elements, and with the number of such rows of containers being equal to the number of tracks of said stream of containers; said arrangement comprises:

a feed mechanism provided with first conveying means for conveying said containers in a conveying direction;

a withdrawal mechanism provided with second conveying means for conveying said containers in a conveying direction, with said withdrawal mechanism being disposed downstream of said feed mechanism and being divided by said separating elements, which extend in said conveying direction of said withdrawal mechanism, into a plurality of lanes, one for each of said rows of containers, whereby said withdrawal mechanism has a conveying width, measured transverse to said conveying direction, that is greater than the conveying width of said feed mechanism;

a transition zone provided with third conveying means for conveying said containers in a conveying direction, with said transition zone being disposed between said feed mechanism and said withdrawal mechanism, and serving to distribute said containers of said multi-track stream into said individual lanes of said withdrawal mechanism; each of said conveying means includes a plurality of upper lengths that form support surfaces for said containers and that are each disposed in a conveying direction and are disposed next to one another when viewed transverse to said conveying direction; the upper lengths of said third conveying means of said transition zone spread apart in a fan-like manner in a downstream conveying direction in such a way that a spacing between adjacent ones of said upper lengths increases in said conveying direction, but with the maximum value of said spacing always being less than the diameter of said containers and the width of said lanes of said withdrawal mechanism;

said upper lengths of said third conveying means of said transition zone being provided with guide projections; and in the region of said transition zone, a respective guide means is provided for each upper length of said third conveying means, with said guide projections being slidingly guided in said guide means, said third conveying means of said transition zone being formed by band chains made up of portions on which said guide projections are provided, with those guide projections that are guided in said guide means being formed by those guide projections of said band chain portions via which the latter are hingedly interconnected to form said chains.

2. An arrangement according to claim 1, in which said upper lengths of said third conveying means of said transition zone spread apart, in a fan-like manner, symmetrically relative to a central axis of said transition zone, which central axis extends in the conveying direction.

3. An arrangement according to claim 1, in which said third conveying means of said transition zone, and said first conveying means of said feed mechanism, are formed by one and the same conveying means.

4. An arrangement according to claim 3, in which said second conveying means of said withdrawal mechanism are the same conveying means as said third conveying means of said transition zone.

5. An arrangement according to claim 1, in which said third conveying means of said transition zone is independent of said first conveying means of said feed mechanism.

6. An arrangement according to claim 5, in which said third conveying means of said transition zone, and said second conveying means of said withdrawal mechanism, are formed by one and the same conveying means.

7. An arrangement according to claim 5, in which the number of said upper lengths of said third conveying means of said transition zone is greater than the number of said upper lengths of said first conveying means of said feed mechanism.

8. An arrangement according to claim 7, in which the width of said upper lengths of said first conveying means of said feed mechanism is equal to the width of said upper lengths of said third conveying means of said transition zone.

9. An arrangement according to claim 7, in which the width of said upper lengths of said third conveying means of said transition zone is considerably narrower than the width of said upper lengths of said first conveying means of said feed mechanism.

10. An arrangement according to claim 9, in which the ratio of the width of said upper lengths of said first conveying means of said feed mechanism to the width of said upper lengths of said third conveying means of said transition zone is at least, and is preferably greater than, two.

11. An arrangement according to claim 10, wherein the ratio is greater than two.

12. An arrangement according to claim 1, which includes a guide plate that is disposed below said upper lengths of said conveying means, and which is provided with said guide means in the form of guide grooves.

13. An arrangement according to claim 1, which includes, in a region where said containers are transferred from said feed mechanism to said transition zone, a stationary back-up plate that has an upper surface that forms a fixed support surface for said containers, with said support surface following said feed mechanism and preceding said transition zone.

14. An arrangement according to claim 13, in which said back-up plate has a leading edge that is remote from said feed mechanism and extends essentially at right angles to said conveying direction of said transition zone.

15. An arrangement according to claim 13, in which said back-up plate has a leading edge that is remote from said feed mechanism and is provided with at least one portion that extends at an angle to said conveying direction of said transition zone.

16. An arrangement according to claim 1, in which the width of said upper lengths of said third conveying means of said transition zone is considerably narrower than the diameter of said containers and the width of said lanes of said withdrawal mechanism.

17. An arrangement according to claim 16, in which the width of said lanes of said withdrawal mechanism is at least two times the width of said upper lengths of said third conveying means of said transition zone.

18. An arrangement according to claim 1, which includes means for adjusting the width of said feed mechanism, of said transition zone, and of said lanes of said withdrawal mechanism.

19. An arrangement according to claim 1, which includes back-up indicator means provided on at least one side of said transition zone to emit a signal for shutting-off said feed mechanism when a container back-up occurs in said transition zone.

20. An arrangement according to claim 1, in which said transition zone adjoins said feed mechanism in such a way that said conveying direction of said transition zone is the same as said conveying direction of said feed mechanism.

21. An arrangement according to claim 1, in which said transition zone adjoins said feed mechanism in such a way that said conveying direction of said transition zone forms an angle with said conveying direction of said feed mechanism.

22. An arrangement according to claim 1, in which an inlet portion of said withdrawal mechanism disposed immediately downstream of said transition zone is curved.

23. An arrangement for converting a multi-track, closely packed stream of containers into a plurality of parallel rows of containers, with such rows being separated from one another by parallel, spaced-apart separating elements, and with the number of such rows of containers being equal to the number of tracks of said stream of containers; said arrangement comprises:
  a feed mechanism provided with first conveying means for conveying said containers in a conveying direction;
  a withdrawal mechanism provided with second conveying means for conveying said containers in a conveying direction, with said withdrawal mechanism being disposed downstream of said feed mechanism and being divided by said separating elements, which extend in said conveying direction of said withdrawal mechanism, into a plurality of lanes, one for each of said rows of containers, whereby said withdrawal mechanism has a conveying width, measured transverse to said conveying direction, that is greater than the conveying width of said feed mechanism;
  a transition zone provided with third conveying means for conveying said containers in a conveying direction, with said transition zone being disposed between said feed mechanism and said withdrawal mechanism, and serving to distribute said containers of said multi-track stream into said individual lanes of said withdrawal mechanism; each of said conveying means includes a plurality of upper lengths that form support surfaces for said containers and that are each disposed in a conveying direction and are disposed next to one another when viewed transverse to said conveying direction; the upper lengths of said third conveying means of said transition zone spread apart in a fan-like manner in a downstream conveying direction in such a way that a spacing between adjacent ones of said upper lengths increases in said conveying direction, but with the maximum value of said spacing always being less than the diameter of said containers and the width of said lanes of said withdrawal mechanism; and in a region where said containers are transferred from said feed mechanism to said transition zone, a stationary back-up plate that has an upper surface that forms a fixed support surface for said containers, with said support surface following said feed mechanism and preceding said transition zone, said back-up plate having a leading edge that is remote from said feed mechanism and is provided with at least one portion that extends at an angle to said conveying direction of said transition zone, said leading edge of said back-up plate being formed by two portions, each of which extends at an angle to said conveying direction of said transition zone, with said two portions, in the region of a central axis of said transition zone, which central axis extends in said conveying direction, joining one another to form an angle that opens with respect to said conveying direction.

24. An arrangement according to claim 23, in which said upper lengths of said third conveying means of said transition zone are provided with guide projections; and in which, in the region of said transition zone, a respective guide means is provided for each upper length of said third conveying means, with said guide projections being slidingly guided in said guide means.

25. An arrangement according to claim 23, wherein the angle opens in said conveying direction.

26. An arrangement according to claim 23, wherein the angle opens counter to said conveying direction.

* * * * *